United States Patent
Thal et al.

(10) Patent No.: US 7,209,161 B2
(45) Date of Patent: Apr. 24, 2007

(54) METHOD AND APPARATUS FOR ALIGNING A PAIR OF DIGITAL CAMERAS FORMING A THREE DIMENSIONAL IMAGE TO COMPENSATE FOR A PHYSICAL MISALIGNMENT OF CAMERAS

(75) Inventors: German Von Thal, Santa Maria, CA (US); Gregory A. Roberts, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 647 days.

(21) Appl. No.: 10/195,837

(22) Filed: Jul. 15, 2002

(65) Prior Publication Data

US 2004/0008250 A1    Jan. 15, 2004

(51) Int. Cl.
*H04N 13/00* (2006.01)

(52) U.S. Cl. .............................. 348/42; 348/47; 348/46; 348/95; 348/94; 348/190; 348/187; 348/222

(58) Field of Classification Search .................. 348/42, 348/47, 94, 95, 135, 190, 46, 189, 180, 187, 348/222; 382/141, 154, 286, 291
See application file for complete search history.

(56) References Cited

U.S. PATENT DOCUMENTS

| | | | |
|---|---|---|---|
| 5,638,461 A * | 6/1997 | Fridge | 382/141 |
| 5,809,658 A | 9/1998 | Jackson et al. | |
| 5,978,143 A * | 11/1999 | Spruck | 359/619 |
| 6,191,809 B1 * | 2/2001 | Hori et al. | 348/45 |
| 6,477,260 B1 * | 11/2002 | Shimomura | 382/106 |
| 6,768,509 B1 * | 7/2004 | Bradski et al. | 348/207.99 |
| 6,778,216 B1 * | 8/2004 | Lin | 348/333.11 |

* cited by examiner

*Primary Examiner*—Shawn S. An
(74) *Attorney, Agent, or Firm*—Harness, Dickey & Pierce, P.L.C.

(57) ABSTRACT

An apparatus and method for detecting and correcting for physical misalignments of a pair of digital cameras creating a composite, three dimensional (3D) image of a target. The method involves using the distances from each of a pair of digital cameras to a target and determining correction offset values for one or the other of the images produced in the digital cameras to achieve pixel-to-pixel coincidence of the two images. The correction offset values are calculated and performed in real time and eliminate the need to physically remove a common platform on which the cameras are mounted from a mobile platform or other support structure, and to transport same to a laboratory environment for the needed calibration. Advantageously, the correction values are generated electronically and applied in real time as any misalignment between the cameras is sensed.

14 Claims, 2 Drawing Sheets

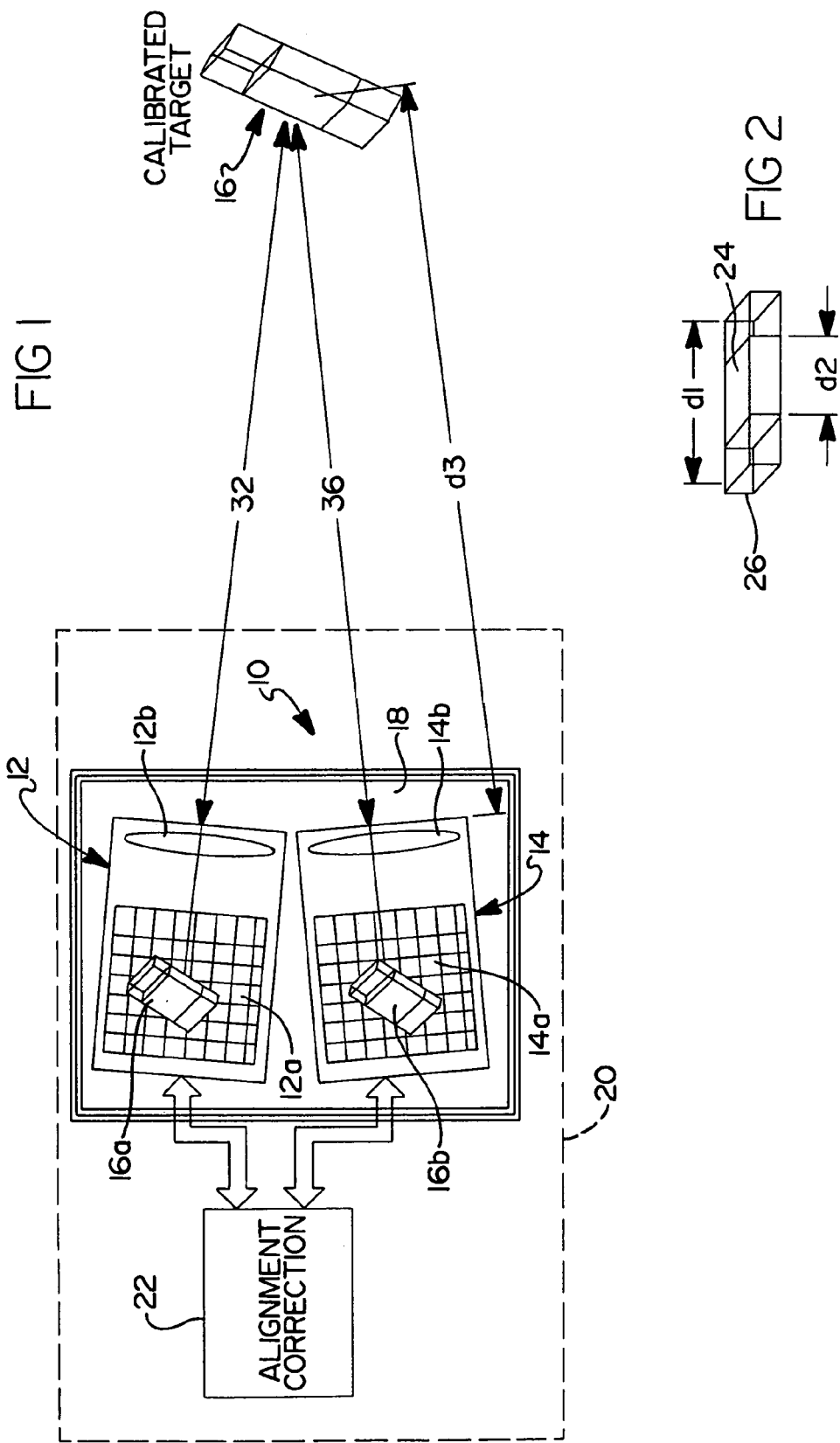

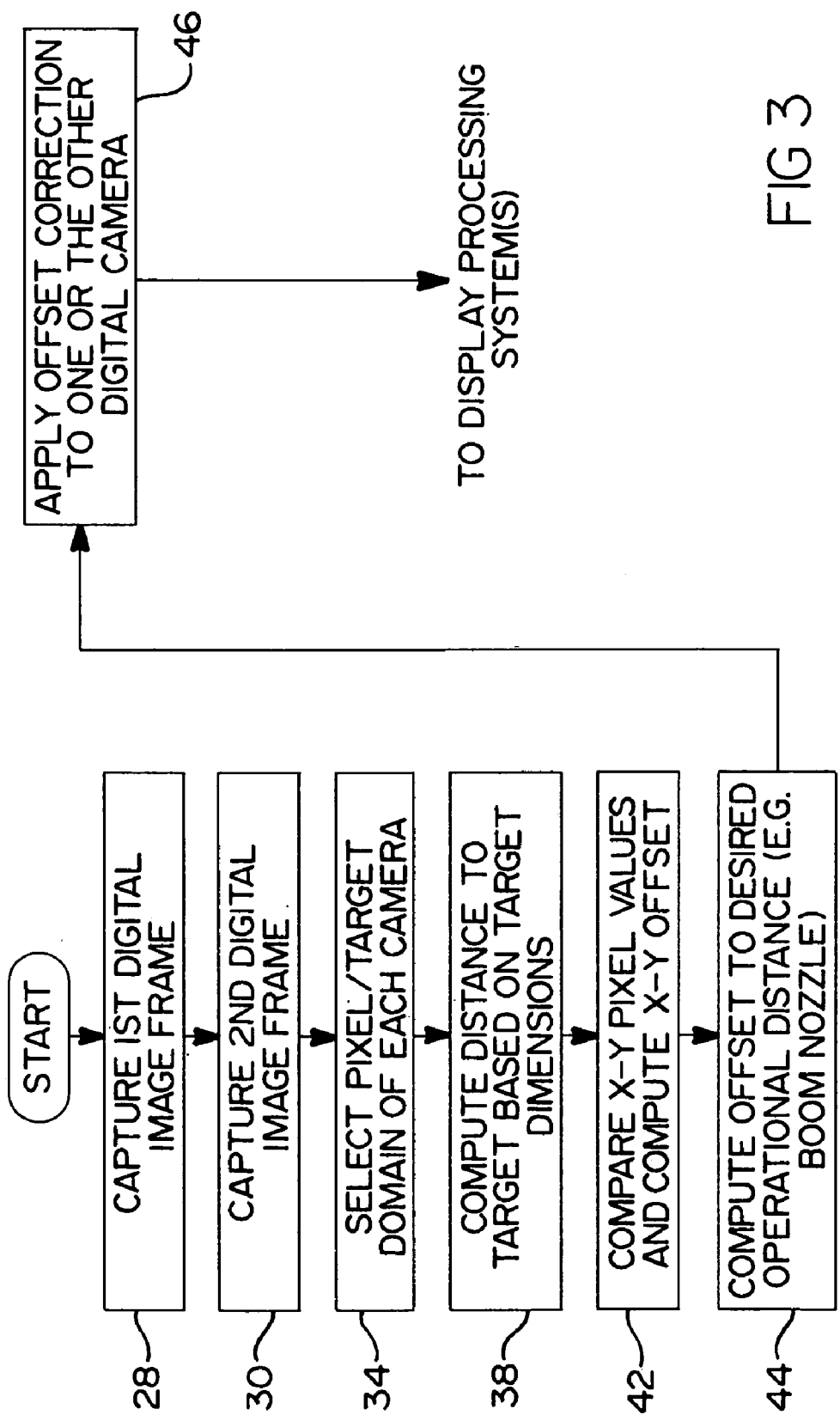

METHOD AND APPARATUS FOR ALIGNING A PAIR OF DIGITAL CAMERAS FORMING A THREE DIMENSIONAL IMAGE TO COMPENSATE FOR A PHYSICAL MISALIGNMENT OF CAMERAS

FIELD OF THE INVENTION

The present invention relates to digital camera systems, and more particularly to a method and apparatus for electronically altering the digital image being produced by one of a pair of digital cameras cooperatively forming a three dimensional image, to thereby account for misalignment between the two cameras.

BACKGROUND OF THE INVENTION

Present three dimensional (3D) imaging systems used in remote vision applications require very accurate physical alignment of the pair of cameras being used to form the 3D image. More particularly, very fine pixel-to-pixel coincidence is needed to accurately produce a three dimensional image from the two cameras. The ability to provide an accurate, three dimensional image is especially important in certain applications, such as with military refueling tanker aircraft. With refueling tanker aircraft, a 3D vision system must be capable of providing an accurate and clear 3D image to an operator monitoring the positioning of a boom relative to an aircraft being refueled. This implementation has previously required the two digital cameras to be mounted on a common, highly complex platform and for prealignment of the cameras to be performed in a laboratory environment while the cameras were positioned on the platform before installing the platform on the aircraft. The need to perform this prealignment procedure in a laboratory environment contributes to the time and expense associated with the use of a 3D vision system.

In view of the foregoing, it will be appreciated then that there is a need for a method for aligning a pair of digital cameras to produce an accurate 3D image. More particularly, there is a need for a method to perform this alignment electronically, particularly aboard an aircraft so that same can be accomplished in real time and without the necessity of removing the digital cameras, and any supporting platform that they may be mounted on, to a laboratory or test facility.

SUMMARY OF THE INVENTION

The present invention is directed to a system and method for aligning a pair of digital cameras to produce an accurate three dimensional (3D) image of a target being viewed by the two cameras. The method generally involves aiming a first digital camera at a target to produce a first image which is comprised of a first plurality of pixels. A second digital camera, spaced apart from the first digital camera, is also aimed at the target to produce a second image comprised of a second plurality of pixels. Using known distances of the target from each of the digital cameras, the positions of the pixels forming each of the first and second images can be analyzed. Appropriate corrections can then be determined electronically which effectively alter one or the other, or both, of the images as needed to produce an accurate, composite, three dimensional image of the target.

In one preferred method, the analysis of the two images comprises determining an image offset value for each pixel forming at least one of the two images. The image offset value is comprised of a lateral offset value, an elevation offset value, and a roll offset value. These three offset values cooperatively alter one of the first and second images along X, Y and θ (roll) axes to reposition and/or resize the image being electronically altered such that the composite three dimensional image is accurately produced. It will be appreciated that in applications where both cameras can be mechanically mounted in the same platform to eliminate roll shift, the value of θ becomes zero and does not have to be included in computing the image offset value.

In one preferred implementation, the method is able to alter one or both of the digital images electronically to provide pixel coincidence at the operational distance (boom tip, e.g., in a refueling aircraft application). In this implementation a pixel offset of a dimensioned target, located at a distance less than the operational distance, can be generated. The offset can be adjusted and applied to the operational distance using trigonometric functions.

A principal advantage of the present invention is that since the digital images produced by each of the two digital cameras are electronically aligned, such alignment can be performed very quickly. It also becomes unnecessary to remove the cameras from their common mounting platform or from an aircraft or other vehicle to which they may be directly mounted on. This eliminates the time and expense associated with previous approaches for aligning digital images that involve the requirement of removing the entire mounting platform on which the cameras are mounted and transporting the platform to a laboratory environment where the alignment can be effected.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 1 is a simplified block diagram of a system in accordance with a preferred embodiment of the present invention illustrating a pair of digital cameras supported on a mounting platform, wherein the cameras are being used to produce digital images of a target;

FIG. 2 is a simplified drawing of the target illustrating the distances D1 and D2 used by the method in performing its alignment of the digital images; and FIG. 3 is a flow chart of the steps performed by the method of the present invention in aligning the digital images from a pair of digital cameras to produce an accurate, composite, three dimensional digital image.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown a digital imaging system 10 in accordance with a preferred embodiment of the present invention for forming a composite, three dimensional digital image. System 10 includes a pair of digital cameras 12 and 14 which each are directed at a common target 16. The cameras 12 and 14 are also mounted on a platform 18 which is in turn supported on a different structure or a platform 20, such as possibly an aircraft, bus or other motor vehicle, ship, or even stationary support surface. Accordingly, while it will be appreciated that the present invention 10 will have particular utility with regard to use on mobile platforms, the invention is not so limited and may be used in connection with fixed (i.e., ground-based) support structures.

The imaging system 10 further includes an alignment correction circuit 22 which is in bidirectional communication with each of the digital cameras 12 and 14. The alignment correction circuit 22 may be mounted on the mounting platform 18 along with the cameras 12 and 14, or it may be mounted on the platform 20 apart from the platform 18, or even remotely from the platform 20.

In operation, each of the digital cameras 12 and 14 produces an image, 16a and 16b, respectively of the target 16. The images 16a and 16b are painted in the pixel arrays 12a and 14a of the cameras 12 and 14, respectively, in such a manner that there is "pixel-to-pixel coincidence". By "pixel-to-pixel coincidence" it is meant that the images must be produced within the two pixel arrays 12a and 14a such that they essentially occupy the same number of pixels. Thus, if one of the images 16a or 16b is shifted in an X direction or a Y direction within its respective pixel array 12a or 14a, the resulting composite three dimensional image will not be clear and unambiguous. It will be appreciated that even very minor positional misalignments of one or the other of the cameras 12 and 14 can produce misalignments that will negatively effect the resulting composite 3D image generated by the system 10.

Referring briefly to FIG. 2, it will be appreciated that the target 16, when viewed as a digital image, will typically be represented by hundreds, or perhaps thousands, of pixels. The target can be thought of as having a center portion 24 and an outer bound or periphery 26. The center 24 of the target 16 has a distance D2, while the outer boundary or periphery of the image of the target is defined by distance D1. The dimensions D1 and D2 can be used to more accurately derive the distance from the target to the platform 18.

Referring to FIG. 3, a preferred method implemented by the system 10 of the present invention is illustrated in simplified flow chart form. The method involves capturing a first digital image, as indicated at step 28, from the first digital camera 12. A second digital image frame is captured at step 30 from the second digital camera 14. A pixel set is then selected from each frame which indicates the identical pixel content of the target 16. Then, the X-Y values are determined in step 34. The distance from the lens 12b of the first digital camera 12 to the target 16, as indicated by line 32, is determined at step 38. The distance, represented by line 36, separating the target 16 from the lens 14b of the second digital camera 14 is the same as line 32.

The alignment correction system 22 uses the known distances represented by lines 32 and 36 in analyzing the images 16a and 16b to determine the correction that needs to be applied to one or the other of the images 16a and 16b. The next step is to compute the offset necessary to be applied to the operational distance (camera to boom) using trigonometric functions in step 44. As described above, the correction is that alteration of the pixels used to form one or the other of the images 16a and 16b (or possibly both images) that is sufficient to produce pixel-to-pixel coincidence of the two images. This step is indicated by reference numeral 40 in FIG. 3.

At step 42, the alignment correction system 22 determines the appropriate correction offset values in X, Y and θ (roll) (i.e., lateral, elevation and roll) directions that are needed to alter the position of one of the images 16a or 16b to produce pixel-to-pixel coincidence of the two images. It will be appreciated that while the pixel arrays 12a and 14a are two dimensional displays, that reference to a roll offset correction value represents modifications to one of the images 16a or 16b, in terms of the pixels being used to form the image, that effectively rotates the image 16a or 16b in its associated pixel array 12a or 14a, respectively. Thus, one of the images 16a or 16b may not only need to be magnified or reduced in size, but it may also need to be shifted in the X direction or the Y direction, as indicated in FIG. 2. By analyzing the pixels representing the images 16a and 16b, together with the distances represented by lines 32 and 36, alignment correction system 22 can determine the needed corrections to produce accurate pixel-to-pixel coincidence for the two images 16a and 16b, as corrected for the operational target. The determined corrections are then applied to at least one of the images 16a or 16b, at step 46, and the process is repeated if necessary.

The analysis and manipulation of one or the other of the images 16a and 16b by the alignment correction system 22 can be performed by a suitable software application. The software application essentially mathematically compares the pixels making up the images 16a and 16b and applies suitable modifications to one or the other of the images as needed to produce the pixel-to-pixel coincidence of the displays 12a and 14a.

The system 10 and method of the present invention provides the important benefit that the offset correction values are calculated and applied electronically in real time to one or the other (or both) of the images 16a or 16b on the ground, when the target is a ground based target. The method can also be used in flight, e.g., with an aircraft where the actual boom tip forms the target 16. Thus, any sudden vibration or movement that would cause misalignment of one or the other of cameras 12 or 14 can be immediately detected and corrected for by the alignment correction system 22. Also importantly, there is no need to remove the platform 18 supporting the cameras 12 and 14 for calibration in the event a misalignment is detected. This saves significant time and money in the maintenance of a 3D vision system.

While it will be appreciated that the present invention will find particularly utility in connection with military tanker aircraft employing a refueling boom, the system 10 can be used with a wide variety of other mobile platforms such as busses, ships and other land, sea, air and space vehicles where use of a 3D vision system is needed. The present invention is further not limited to mobile platforms, but may also be used in connection with a ground-based structure where a 3D vision system is needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for physically aligning a pair of digital cameras relative to each other, without the use of a pre-existing calibration image, to produce a three dimensional image, said method comprising:

a) mounting said digital cameras on a mobile platform that experiences at least one of motion and vibration;
b) aiming a first digital camera at a target to produce a first image comprised of a first plurality of pixels;
c) aiming a second digital camera spaced apart from said first digital camera at said target to produce a second image comprised of a second plurality of pixels;
d) using known distances of said target from each of said digital cameras to analyze positions of one of said first and second pluralities of pixels relative to the other;
e) using said positions of said pluralities of pixels of said first and second images to generate calibration signals that form an image offset value to alter at least one of said first and second images derived from said target, to thereby account for physical misalignment of one of said digital cameras relative to the other, without reference to a pre-existing calibration image.

2. The method of claim 1, wherein said image offset value is comprised of a lateral offset value.

3. The method of claim 1, wherein said image offset value is comprised of an elevation value.

4. The method of claim 1, wherein said image offset value is comprised of a roll value.

5. The method of claim 1, wherein said image offset value is comprised of a lateral offset value, an elevation offset value, and a roll offset value, to thereby alter one of said first and second images in X, Y and roll coordinate directions.

6. The method of claim 1, further comprising using both of said first and second images from a corresponding one of said digital cameras to determine a distance separating said target from said digital cameras.

7. The method of claim 6, further comprising using a mathematical processing step to mathematically determine an image offset value needed to compensate for a difference in said distance of said target from the other one of said digital cameras.

8. A method for aligning images produced by each one of a pair of digital cameras, without the use of a pre-existing calibration image, to produce a composite, three dimensional image from said first and second images, said method comprising:
a) mounting a first digital camera on a first platform;
b) mounting a second digital camera on a second platform;
c) mounting said first and second platforms on a mobile platform that experiences at least one of motion and vibration;
d) using said first digital camera having a first display screen to generate a first digital image of said target, said first digital image being comprised of a first plurality of pixels;
e) using said second digital camera having a second display screen to generate a second digital image of said target, said second digital image being comprised of a second plurality of pixels;
f) determining a first distance from a focal plane of said first digital camera to said target;
g) determining a second distance from a focal plane of said second digital camera to said target;
h) using said first and second distances to determine a misalignment of said first digital image relative to said second digital image;
i) in response to determining said misalignment, generating correction signals to be electronically applied to one of said first and second digital images, derived from said target, to alter said one image within its associated said display screen, to thereby electronically compensate for said physical misalignment of one of said digital images relative to the other; and
j) using operation i) to generate an offset value for altering said one digital image relative to one of an X coordinate plane and a Y-coordinate plane without reference to a pre-existing calibration image.

9. The method of claim 8, wherein operation i) comprises generating an offset value for altering said one digital image relative to a roll (θ) axis.

10. The method of claim 8, where said first and second platforms comprise first and second portions of a common platform.

11. A method for correcting for physical misalignment of one digital camera relative to another digital camera, where the digital cameras are used to produce a three dimensional image, and without the use of a dedicated calibration image, said method comprising:
supporting said digital cameras on a mobile platform experiencing at least one of motion and vibration:
using a first digital camera to produce a first image of a target, said first image being comprised of a plurality of pixels;
using a second digital camera to produce a second image of said target, said second image being comprised of a second plurality of pixels;
analyzing positions of said first plurality of pixels against positions of said second plurality of pixels;
using distances separating each of said digital cameras from said target, and differences in the positions of said first and second pluralities of pixels within respective image display screens of said digital cameras, to generate real time digital image correction signals that need to be applied to one of said images to account for said physical misalignment of said digital cameras relative to each other; and
applying said digital correction signals to one of said digital cameras to alter positions of at least a subplurality of said pixels of said image being produced by said one digital camera, and without reference to a dedicated calibration image.

12. The method of claim 11, wherein said digital correction signals comprise digital signals that alter at least some of said pixels making up said one image in at least an X coordinate plane.

13. The method of claim 11, wherein said digital correction signals comprise digital signals that alter at least some of said pixels making up said one image in at least a Y coordinate plane.

14. The method of claim 11, wherein said digital correction signals comprise digital signals that alter at least some of said pixels making up said one image in at least a roll (θ) axis.

* * * * *